US010310787B2

(12) United States Patent
Minami

(10) Patent No.: US 10,310,787 B2
(45) Date of Patent: Jun. 4, 2019

(54) APPARATUS, INFORMATION PROCESSING METHOD AND COMPUTER-READABLE MEDIUM FOR DISPLAYING SHEET IMAGE OF PART, CORRESPONDING TO SELECTED ITEM, OF DETERMINED SHEET

(71) Applicant: CASIO COMPUTER CO., LTD., Tokyo (JP)

(72) Inventor: Kazuhiro Minami, Kawaguchi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/712,356

(22) Filed: Sep. 22, 2017

(65) Prior Publication Data

US 2018/0165049 A1 Jun. 14, 2018

(30) Foreign Application Priority Data

Dec. 13, 2016 (JP) ................................ 2016-240829

(51) Int. Cl.

| | |
|---|---|
| ***G06F 3/12*** | (2006.01) |
| ***G06F 3/0482*** | (2013.01) |
| ***G06F 17/21*** | (2006.01) |
| ***G06Q 10/10*** | (2012.01) |

(52) U.S. Cl.

CPC .......... *G06F 3/1252* (2013.01); *G06F 3/0482* (2013.01); *G06F 3/1263* (2013.01); *G06F 17/212* (2013.01); *G06Q 10/105* (2013.01)

(58) Field of Classification Search

None

See application file for complete search history.

(56) References Cited

U.S. PATENT DOCUMENTS

2011/0083074 A1* 4/2011 Jellison, Jr. ........... G06F 3/0481 715/716
2013/0174041 A1* 7/2013 Chakravarthy ....... G06F 3/0482 715/733
2015/0143248 A1* 5/2015 Beechuk ................. H04L 67/10 715/739
2015/0213211 A1* 7/2015 Zaleski ............... G06F 16/9535 715/753
2017/0116373 A1* 4/2017 Ginsburg ............ G06F 3/04817
2017/0212656 A1* 7/2017 Lin-Hendel ........... G06F 3/0485
2017/0329468 A1* 11/2017 Schon ................. G06F 3/04845

FOREIGN PATENT DOCUMENTS

JP H11-345269 A 12/1999

* cited by examiner

*Primary Examiner* — Henok Shiferaw

(74) *Attorney, Agent, or Firm* — Scully Scott Murphy & Presser

(57) ABSTRACT

An information processing apparatus includes an item list display controller, an item selector, a sheet determiner and an item display controller. The item list display controller displays a list of items included in sheets on a display. The item selector allows a user to select a desired item from the list of the items. The sheet determiner determines a sheet which includes the selected item. The item display controller displays a sheet image of a part corresponding to the selected item of the determined sheet on the display.

20 Claims, 12 Drawing Sheets

20

| | | | | | | | |
|---|---|---|---|---|---|---|---|
| 21 | EMPLOYEE CODE | 1001 | 1002 | 1003 | 1004 | 1005 | ... |
| 22 | EMPLOYEE NAME | SHIGERU AOKI | JIRO AOKI | SABURO AOKI | SHIRO AOKI | GORO AOKI | ... |
| 23 | NAME IN JAPANESE | ｱｵｷ ｼｹﾞﾙ | ｱｵｷ ｼﾞﾛｳ | ｱｵｷ ｻﾌﾞﾛｳ | ｱｵｷ ｼﾛｳ | ｱｵｷ ｺﾞﾛｳ | ... |
| 24 | GENDER | MALE | MALE | MALE | MALE | MALE | ... |
| 25 | BIRTH DATE | AUG.1,1955 | OCT.1,1965 | NOV.1,1975 | DEC.1,1985 | JAN.1,1995 | ... |
| | : | : | : | : | : | : | : |

| 31 SHEET CODE | 1 | 2 | 3 | 4 | 5 | ... |
|---|---|---|---|---|---|---|
| 32 SHEET NAME | EMPLOYEE LEDGER (FORM 1) | EMPLOYEE LEDGER (FORM 2) | EMPLOYEE CARRIER LEDGER | EMPLOYEE SKILL LEDGER | EMPLOYEE SALARY LEDGER | ... |
| 33 X-PIXEL | 1375 | 1375 | 1375 | 1375 | 1375 | ... |
| 34 Y-PIXEL | 971 | 971 | 971 | 971 | 971 | ... |
| 35 STANDARD MAGNIFICATION | 1.2 | 1.2 | 1.2 | 1.2 | 1.2 | ... |

| 51 ITEM CODE | 1000 | 1010 | 1020 | 1030 | ... |
|---|---|---|---|---|---|
| 52 ITEM NAME | BASIC INFORMATION | NAME | ADDRESS | PERSONAL INFORMATION | ... |
| 53 SHEET CODE | 1 | 1 | 1 | 2 | ... |
| 54 STARTING X COORDINATE | x11 | x12 | x13 | x14 | ... |
| 55 STARTING Y COORDINATE | y11 | y12 | y13 | y14 | ... |
| 56 ENDING X COORDINATE | x21 | x22 | x23 | x24 | ... |
| 57 ENDING Y COORDINATE | y21 | y22 | y23 | y24 | ... |

| 61 UPDATE DATE | 10:12, SEP. 28,2016 | 10:10, SEP. 28,2016 | 10:08, SEP. 28,2016 | 10:06, SEP. 28,2016 | ... |
|---|---|---|---|---|---|
| 62 UPDATE MENU NAME | EMPLOYEE INFORMATION REGISTRATION | COMMUTATION EXPENSE APPLICATION REGISTRATION | PERSONAL INFORMATION REGISTRATION | FIXED SALARY REGISTRATION | ... |
| 63 UPDATED USER | user1 | user1 | user1 | user2 | ... |
| 64 EMPLOYEE CODE | 1000 | 1001 | 1002 | 1003 | ... |
| 65 ITEM CODE | 1000,1030 | 2300 | 1050,1060 ,2000 | 6000 | ... |

| 71 TIME TYPE | 1: MONTH-DATE-YEAR | 1: MONTH-DATE-YEAR | 1: MONTH-DATE-YEAR | 2: CUTOFF DATE | 3: DAY OF WEEK | ... |
|---|---|---|---|---|---|---|
| 72 TIME CODE | DEC.10,2016 | DEC.10,2016 | DEC.10,2016 | 20TH | 1 | ... |
| 73 TIME NAME | PREPARATION OF DOCUMENT FOR YEAR-END ADJUSTMENT | PREPARATION OF DOCUMENT FOR YEAR-END ADJUSTMENT | PREPARATION OF DOCUMENT FOR YEAR-END ADJUSTMENT | CUTOFF ON 20TH | MONDAY | ... |
| 74 ITEM CODE | 2000 | 3600 | 3700 | 2300 | 1050,1060 ,2000 | ... |

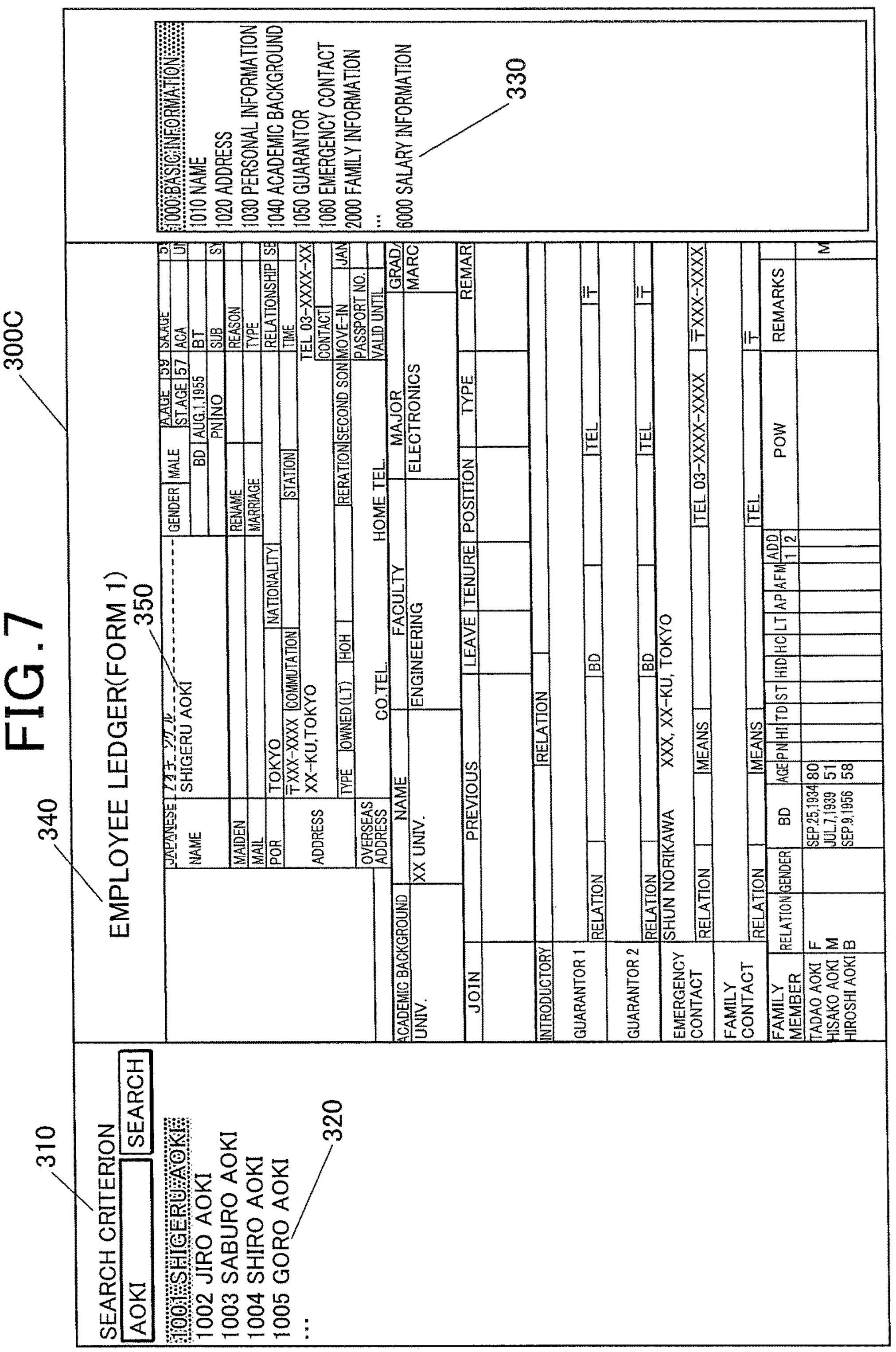

FIG. 7

SEARCH CRITERION — 310
AOKI [SEARCH]

1001 SHIGERU AOKI
1002 JIRO AOKI
1003 SABURO AOKI
1004 SHIRO AOKI
1005 GORO AOKI
... — 320

EMPLOYEE LEDGER (FORM 1) — 350

(Form 300C with fields including:)

- JAPANESE NAME: SHIGERU AOKI
- GENDER: MALE
- AGE: 59
- STAGE: 57
- MAIDEN NAME / RENAME / MARRIAGE
- POB: TOKYO
- NATIONALITY
- MAIL: 〒XXX-XXXX
- COMMUTATION / STATION / TIME
- ADDRESS: XX-KU, TOKYO
- TYPE: OWNED (LT) / HOH / RERATION: SECOND SON / MOVE-IN / JAN
- OVERSEAS ADDRESS / CO.TEL / HOME TEL / TEL 03-XXXX-XX / CONTACT / PASSPORT NO. / VALID UNTIL
- ACADEMIC BACKGROUND: XX UNIV. / FACULTY: ENGINEERING / MAJOR: ELECTRONICS / GRAD / MARC
- JOIN / PREVIOUS / RELATION / LEAVE / TENURE / POSITION / TYPE / REMAR
- INTRODUCTORY
- GUARANTOR 1 — RELATION / BD / TEL / 〒
- GUARANTOR 2 — RELATION / BD / TEL / 〒
- EMERGENCY CONTACT: SHUN NORIKAWA — RELATION / XXX, XX-KU, TOKYO / TEL 03-XXXX-XXXX / 〒XXX-XXXX
- FAMILY CONTACT — RELATION / MEANS / TEL / 〒
- FAMILY MEMBER — RELATION / GENDER / MEANS / AGE / PN / HI / TD / ST / HID / HC / LT / AP / AFM / ADD 1 2 / POW / REMARKS

| FAMILY MEMBER | RELATION | GENDER | BD | AGE | ... | POW | REMARKS |
|---|---|---|---|---|---|---|---|
| TADAO AOKI | F | | SEP.25,1934 | 80 | | | |
| HISAKO AOKI | M | | JUL.7,1939 | 51 | | | M |
| HIROSHI AOKI | B | | SEP.9,1956 | 58 | | | |

— 340

330:
- 1000: BASIC INFORMATION
- 1010 NAME
- 1020 ADDRESS
- 1030 PERSONAL INFORMATION
- 1040 ACADEMIC BACKGROUND
- 1050 GUARANTOR
- 1060 EMERGENCY CONTACT
- 2000 FAMILY INFORMATION
- ...
- 6000 SALARY INFORMATION

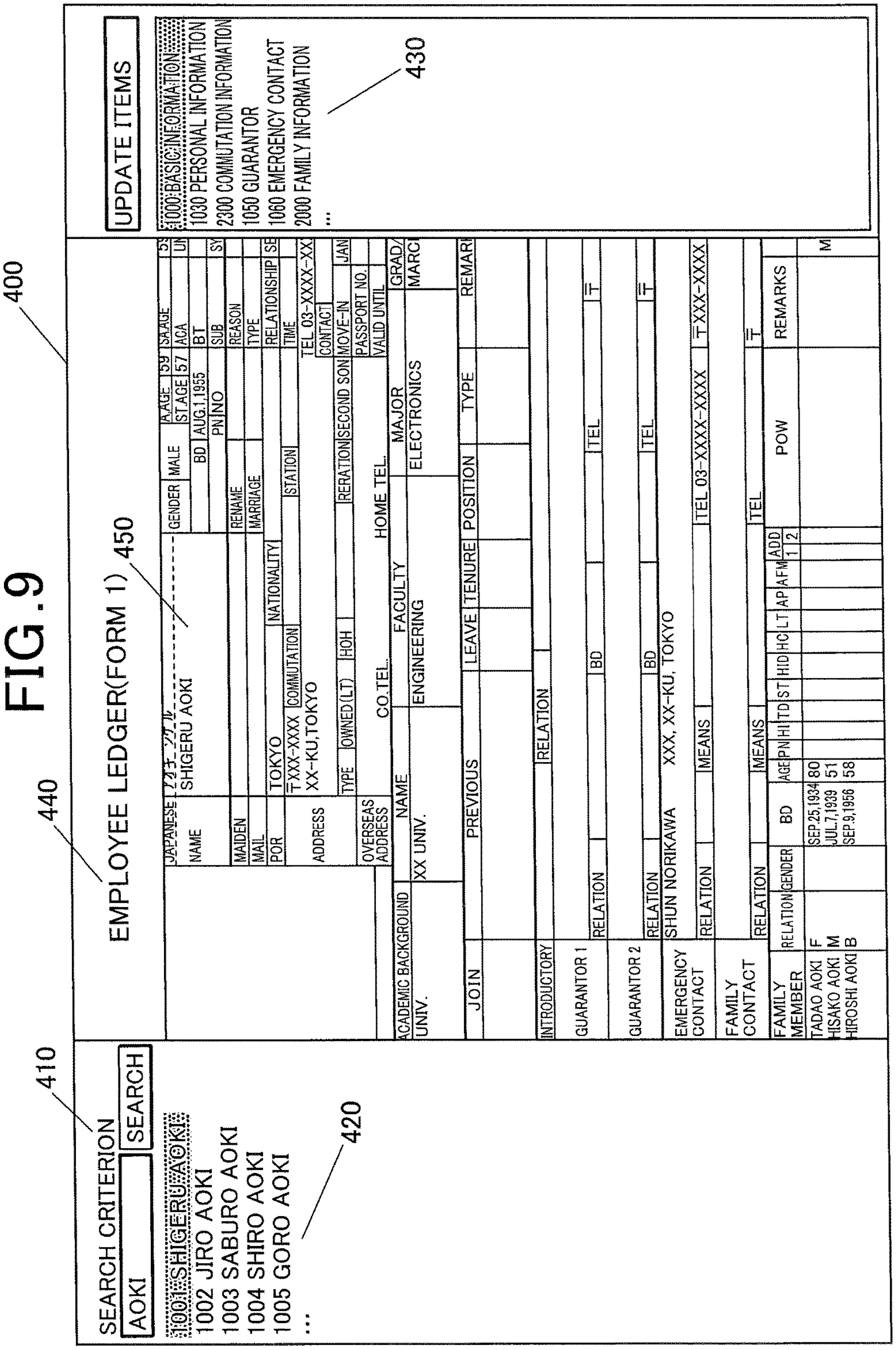

FIG. 9

SEARCH CRITERION [AOKI] [SEARCH]

- 1001 SHIGERU AOKI
- 1002 JIRO AOKI
- 1003 SABURO AOKI
- 1004 SHIRO AOKI
- 1005 GORO AOKI
- ...

(420)

EMPLOYEE LEDGER (FORM 1) 450

| | | | | | | |
|---|---|---|---|---|---|---|
| JAPANESE NAME | SHIGERU AOKI | | GENDER MALE | A.AGE 59 ST.AGE 57 | S.AGE ACA | UN |
| | | | | BD AUG.1,1955 | BT | SY |
| MAIDEN | | | RENAME | PN NO | REASON | SUB |
| MAIL | | | MARRIAGE | | TYPE | |
| POR | TOKYO | NATIONALITY | | STATION | RELATIONSHIP | SE |
| ADDRESS | ⊤XXX-XXXX COMMUTATION | | | | TIME | |
| | XX-KU,TOKYO | | | | TEL 03-XXXX-XX | |
| | TYPE OWNED(LT) HOH | | RERATION SECOND SON | MOVE-IN | CONTACT | JAN |
| OVERSEAS ADDRESS | | | | | PASSPORT NO. | |
| | | | HOME TEL | | VALID UNTIL | |
| ACADEMIC BACKGROUND | NAME | CO.TEL. | FACULTY | MAJOR | GRAD/ |
| UNIV. | XX UNIV. | | ENGINEERING | ELECTRONICS | MARCH |
| JOIN | PREVIOUS | LEAVE TENURE | POSITION | TYPE | REMARK |
| INTRODUCTORY | RELATION | | | | |
| GUARANTOR 1 | RELATION | BD | | TEL | ⊤ |
| GUARANTOR 2 | RELATION | BD | | TEL | ⊤ |
| EMERGENCY CONTACT | SHUN NORIKAWA | XXX, XX-KU, TOKYO | | TEL 03-XXXX-XXXX | ⊤XXX-XXXX |
| FAMILY CONTACT | RELATION | MEANS | | TEL | ⊤ |
| FAMILY MEMBER | RELATION GENDER | MEANS | AGE PN HI TD ST HID HC LT AP AF M ADD 1 2 | POW | REMARKS |
| TADAO AOKI | F | SEP.25,1934 | 80 | | M |
| HISAKO AOKI | M | JUL.7,1939 | 51 | | |
| HIROSHI AOKI | B | SEP.9,1956 | 58 | | |

(400) (440)

UPDATE ITEMS

- 1000 BASIC INFORMATION
- 1030 PERSONAL INFORMATION
- 2300 COMMUTATION INFORMATION
- 1050 GUARANTOR
- 1060 EMERGENCY CONTACT
- 2000 FAMILY INFORMATION (430)

(410)

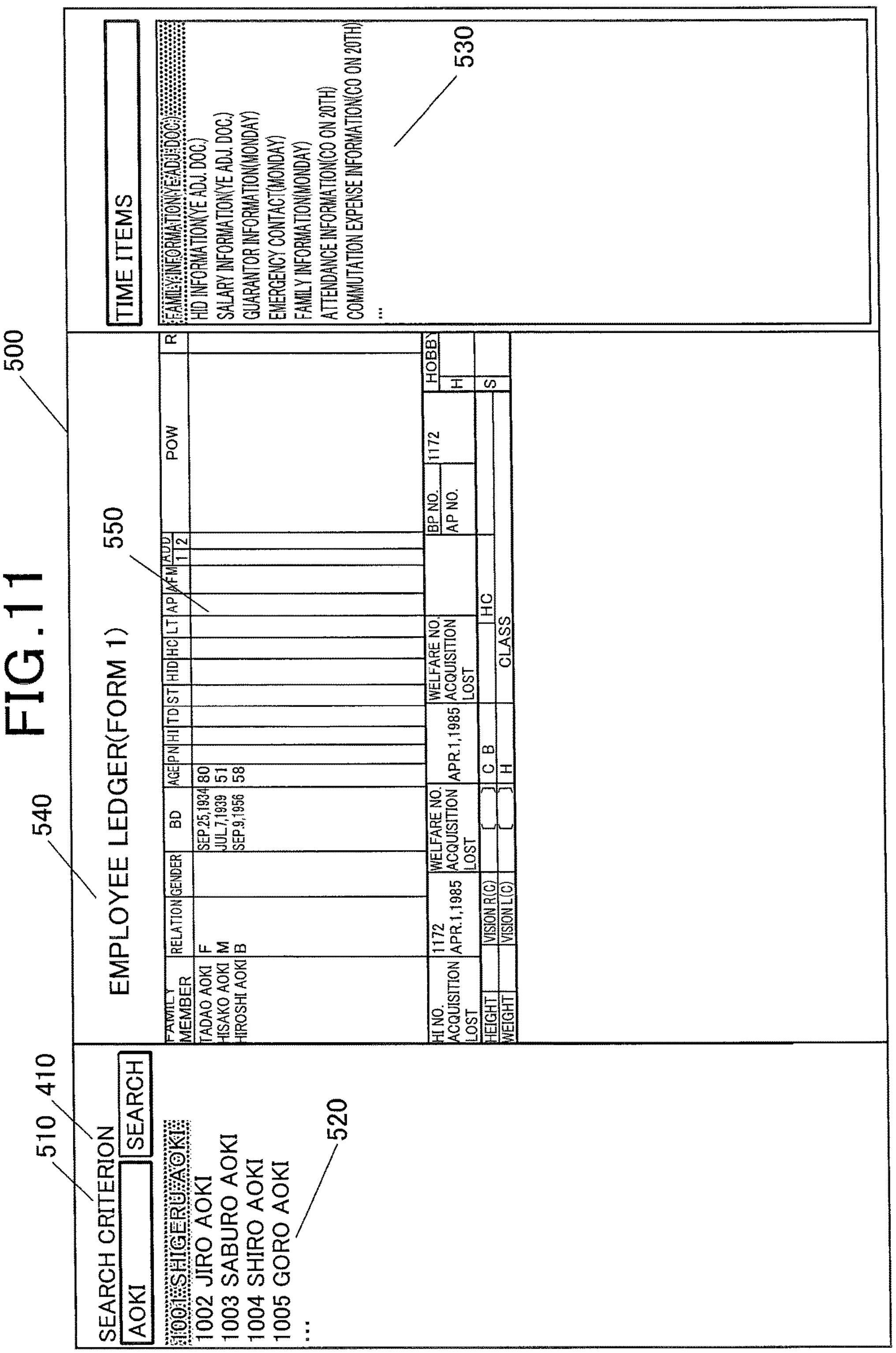

FIG.11

SEARCH CRITERION 510 410
| AOKI | SEARCH |

1001 SHIGERU AOKI
1002 JIRO AOKI
1003 SABURO AOKI
1004 SHIRO AOKI
1005 GORO AOKI
...

520

500

540

EMPLOYEE LEDGER(FORM 1)

550

| FAMILY MEMBER | RELATION | GENDER | BD | AGE | PN | HI | TD | ST | HID | HC | LT | AP | AF | M | ADD | | POW | R |
|---|---|---|---|---|---|---|---|---|---|---|---|---|---|---|---|---|---|---|
| TADAO AOKI | | F | SEP.25,1934 | 80 | | | | | | | | | | 1 | 2 | | | |
| HISAKO AOKI | M | | JUL.7,1939 | 51 | | | | | | | | | | | | | | |
| HIROSHI AOKI | B | | SEP.9,1956 | 58 | | | | | | | | | | | | | | |

| HI NO. | | WELFARE NO. | | | | | | | BP NO. | 1172 | | HOBBY |
|---|---|---|---|---|---|---|---|---|---|---|---|---|
| ACQUISITION | 1172 | ACQUISITION | APR.1,1985 | | | | | | AP NO. | | | H |
| LOST | APR.1,1985 | LOST | | | | | | | | | | |
| HEIGHT | | VISION R(C) | C | B | | | HC | | | | | S |
| WEIGHT | | VISION L(C) | H | | | | CLASS | | | | | |

530

| TIME ITEMS |
|---|
| FAMILY INFORMATION(YE ADJ.DOC.) |
| HID INFORMATION(YE ADJ.DOC.) |
| SALARY INFORMATION(YE ADJ.DOC.) |
| GUARANTOR INFORMATION(MONDAY) |
| EMERGENCY CONTACT(MONDAY) |
| FAMILY INFORMATION(MONDAY) |
| ATTENDANCE INFORMATION(CO ON 20TH) |
| COMMUTATION EXPENSE INFORMATION(CO ON 20TH) |
| ... |

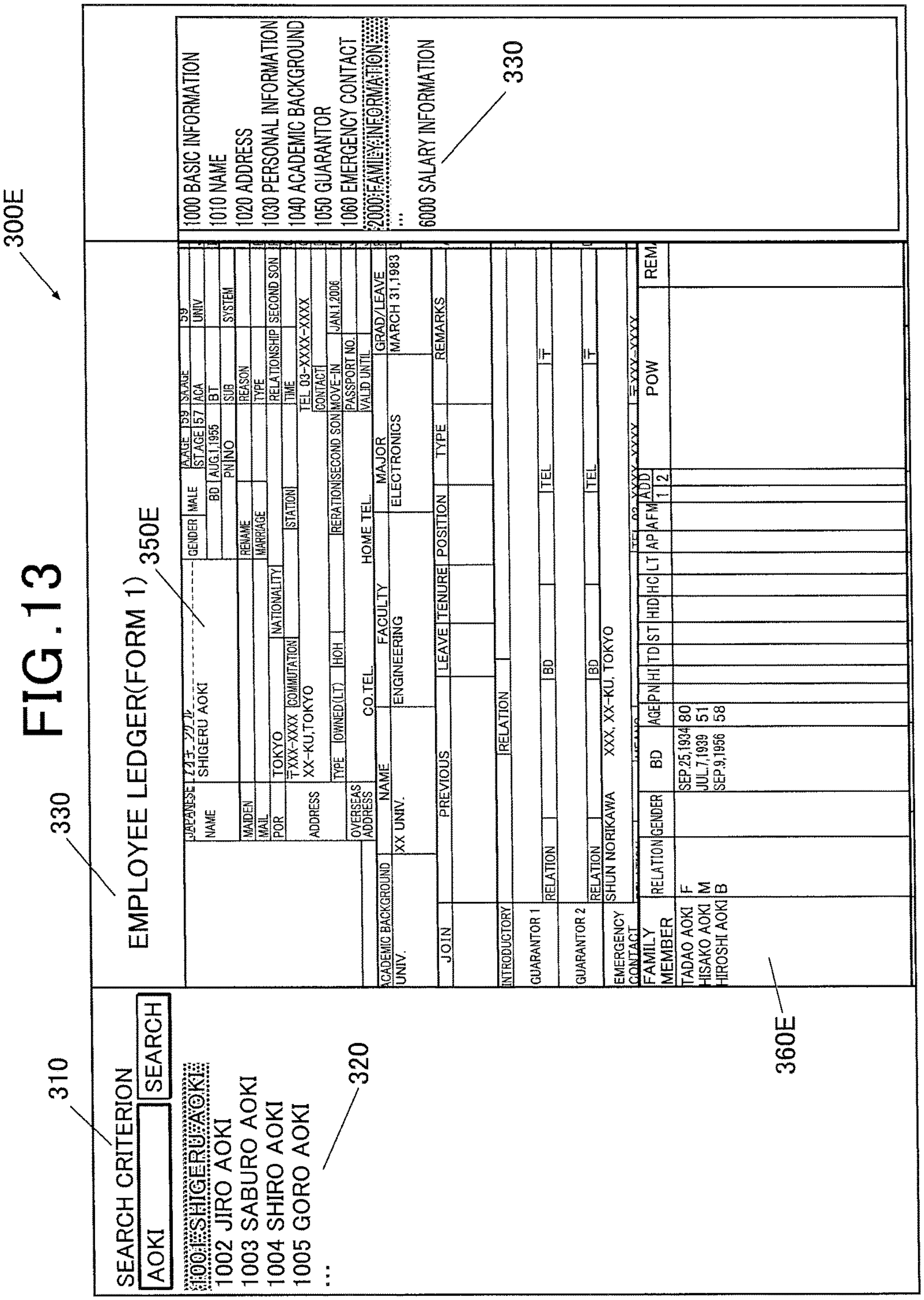

FIG.13

SEARCH CRITERION — 310
[AOKI] [SEARCH]

1001 SHIGERU AOKI
1002 JIRO AOKI
1003 SABURO AOKI
1004 SHIRO AOKI
1005 GORO AOKI
...
— 320

300E
330

EMPLOYEE LEDGER (FORM 1) 350E (form fields including: JAPANESE NAME SHIGERU AOKI, GENDER MALE, AGE 59, STAGE 57, ACA UNIV, BD AUG.1,1955, BT, SUB SYSTEM, PN/NO, MAIDEN NAME, RENAME, REASON, MARRIAGE, POR TOKYO, NATIONALITY, RELATIONSHIP SECOND SON, ADDRESS ￥XXX-XXXX, STATION, TYPE, XX-KU, TOKYO, TEL 03-XXXX-XXXX, TIME, TYPE OWNED/LFT, HOH, RELATION SECOND SON, MOVE-IN JAN.1,2006, CONTACT, CO.TEL, HOME TEL, PASSPORT NO., ACADEMIC BACKGROUND NAME XX UNIV., FACULTY ENGINEERING, MAJOR ELECTRONICS, TYPE, GRAD/LEAVE MARCH 31,1983, VALID UNTIL, JOIN, PREVIOUS, LEAVE, TENURE, POSITION, REMARKS, INTRODUCTORY RELATION, GUARANTOR 1 RELATION, BD, TEL, GUARANTOR 2 RELATION, BD, TEL, EMERGENCY CONTACT SHUN NORIKAWA, XXX, XX-KU, TOKYO, TEL 03-XXXX-XXXX, ￥XXX-XXXX)

| FAMILY MEMBER | RELATION | GENDER | BD | AGE | PN | HI | TD | ST | HID | HC | LT | AP | AFM | ADD | POW | REM |
|---|---|---|---|---|---|---|---|---|---|---|---|---|---|---|---|---|
| TADAO AOKI | F | | SEP.25,1934 | 80 | | | | | | | | | | 1 | | |
| HISAKO AOKI | M | | JUL.7,1939 | 51 | | | | | | | | | | 2 | | |
| HIROSHI AOKI | B | | SEP.9,1956 | 58 | | | | | | | | | | | | |

360E 330
1000 BASIC INFORMATION
1010 NAME
1020 ADDRESS
1030 PERSONAL INFORMATION
1040 ACADEMIC BACKGROUND
1050 GUARANTOR
1060 EMERGENCY CONTACT
2000 FAMILY INFORMATION
...
6000 SALARY INFORMATION

APPARATUS, INFORMATION PROCESSING METHOD AND COMPUTER-READABLE MEDIUM FOR DISPLAYING SHEET IMAGE OF PART, CORRESPONDING TO SELECTED ITEM, OF DETERMINED SHEET

CROSS REFERENCE TO RELATED APPLICATION

This application is based upon and claims the benefit of priority under 35 USC 119 of Japanese Patent Application No. 2016-240829 filed on Dec. 13, 2016, the entire disclosure of which, including the description, claims, drawings and abstract, is incorporated herein by reference in its entirety.

BACKGROUND OF THE INVENTION

1. Field of the Invention

The present invention relates to an information processing apparatus, an information processing method and a computer-readable medium.

2. Description of Related Art

Personnel information inquiry systems for viewing personnel information and history information on employees of a company have been known in the art. Further, some personnel information inquiry systems known in the art can output a sheet in which predetermined items of personnel information are disposed in a predetermined layout.

For example, a data processing apparatus is known in the art as one of such personnel information inquiry systems, which displays a list of employees to be printed and allows a user to input an operation to rearrange the order thereof before printing a sheet such as a personnel announcement with respect to each of the employees, so that the user can rearrange the order of outputting the data of the employees to be printed in sheets (e.g. see JP H11-345269A).

Personnel information inquiry systems known in the art have dedicated display screens and a variety of sheets for their sheet display function. It has been general that display screens and sheets are prepared for respective categories in order to display large amount information included in a sheet.

However, a problem with the configuration of displaying a sheet on a display with respect to each category is that the system requires an effort and a skill of a user who views the information. For example, a menu is often separated, or an item of interest is sometimes included not in a sheet displayed on the screen but in another sheet.

According to a first aspect of the present invention, there is provided an information processing apparatus, including:

an item list display controller which displays a list of items included in sheets on a display;

an item selector which allows a user to select a desired item from the list of the items;

a sheet determiner which determines a sheet which includes the selected item; and an item display controller which displays a sheet image of a part corresponding to the selected item of the determined sheet on the display.

According to a second aspect of the present invention, there is provided an information processing method, including:

displaying a list of items included in sheets on a display;

allowing a user to select a desired item from the list of the items;

determining a sheet which includes the selected item; and displaying a sheet image of a part corresponding to the selected item of the determined sheet on the display.

According to a third aspect of the present invention, there is provided a non-transitory computer-readable medium storing a program causing a computer to perform:

displaying a list of items included in sheets on a display;

allowing a user to select a desired item from the list of the items;

determining a sheet which includes the selected item; and displaying a sheet image of a part corresponding to the selected item of the determined sheet on the display.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 3A illustrates the structure of an output sheet table;

FIG. 3B illustrates the structure of an output item table;

FIG. 3C illustrates the structure of an update item table;

FIG. 3D illustrates the structure of time item table;

FIG. 7 illustrates the third sheet display screen;

FIG. 9 illustrates the fourth sheet display screen;

FIG. 11 illustrate the fifth sheet display screen;

FIG. 13 illustrates the seventh sheet display screen.

DETAILED DESCRIPTION OF PREFERRED EMBODIMENT

Hereinafter, one or more embodiments of the present invention will be described with reference to the drawings. However, the scope of the invention is not limited to the disclosed embodiments.

Figures 1, 2:
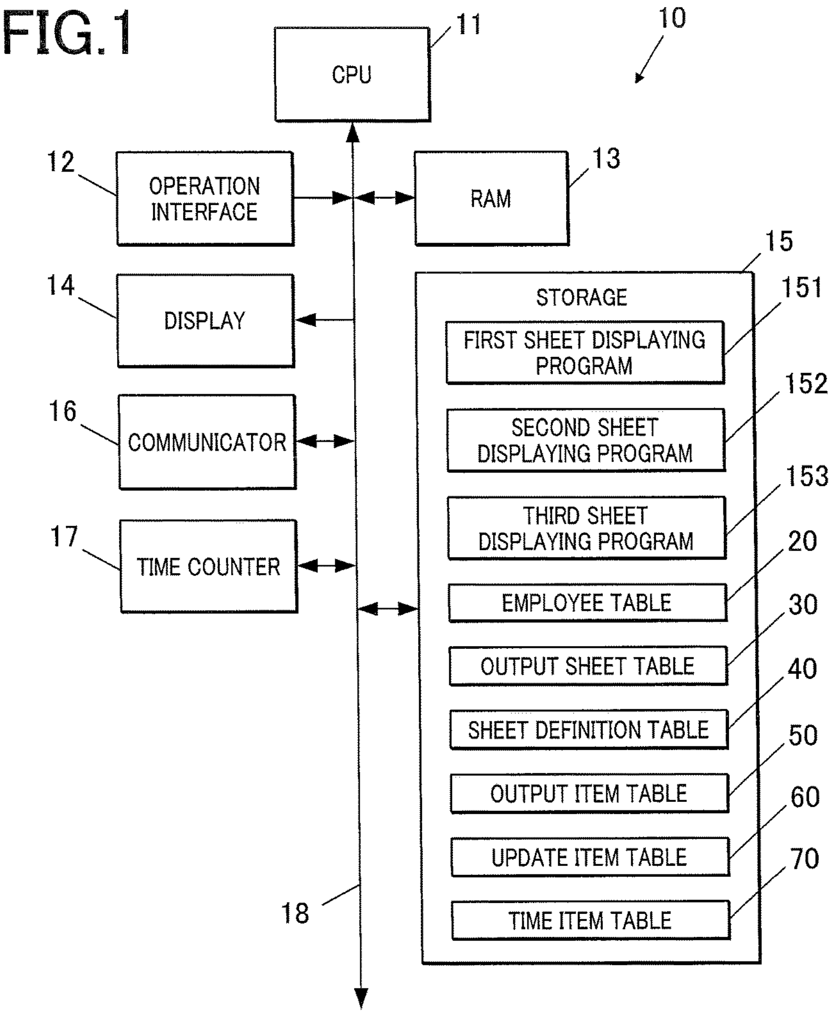
FIG. 1 is a block diagram of a personnel information managing apparatus according to an embodiment of the present invention.
FIG. 2 illustrates the structure of an employee table.

First, the configuration of an apparatus according to the embodiment will be described with FIG. 1. FIG. 1 is a block diagram of the personnel information managing apparatus 10 according to the embodiment.

The personnel information managing apparatus 10 as an information processing apparatus is installed in a personnel department of a certain company (hereinafter referred to simply as a company) or the like to manage personnel information such as the personnel matters, carrier and the like of the employees belonging to the company. However, the personnel information managing apparatus 10 is not limited to managing personnel information on the employees of a company and may be configured to also manage personnel information on other persons in addition to the employees.

As illustrated in FIG. 1, the personnel information managing apparatus 10 includes: a CPU (Central Processing Unit) 11 as an item list display controller, a sheet selector, an item display controller and an object list display controller; an operation interface 12 as an item selector and an object selector; a RAM (Random Access Memory) 13; a display 14 as a display device; a storage 15; a communicator 16; and a time counter 17. These components of the personnel information managing apparatus 10 are connected to each other via a bus 18.

The CPU 11 controls the components of the personnel information managing apparatus 10. The CPU 11 reads out a program specified from among a system program and application programs stored in the storage 15 and develops it on the RAM 13 so as to perform a variety of processing in cooperation with the program.

The operation interface 12 includes a key input device such as a keyboard and a pointing device such as a mouse. The operation interface 12 allows the user (operator) to input a key operation or a location operation and outputs the operational information to the CPU 11.

The RAM 13 is constituted by a volatile memory. The RAM 13 provides a work area for temporarily storing a variety of data and programs.

The display 14 is constituted by an LCD (Liquid Crystal Display), an EL (Electro Luminescent) display or the like. The display 14 displays various screens according to display information from the CPU 11.

The storage 15 is constituted by an HDD (Hard Disk Drive), an SSD (Solid State Drive) or the like, in which data and programs are stored in a readable and writable manner.

In the storage 15, a first sheet displaying program 151, a second sheet displaying program 152, a third sheet displaying program 153, an employee table 20, an output sheet table 30, a sheet definition table 40, an output item table 50, an update item table 60 and a time item table 70 are stored.

The communicator 16 is constituted by a network card or the like, which is connected to a device on a communication network (not shown). The communication network is a LAN (Local Area Network), a WAN (Wide Area Network) or the like. The CPU 11 can communicate with the devices on the communication network through the communicator 16.

The time counter is constituted by a real-time clock. The time counter 17 counts the current date and time and outputs the current date and time information to the CPU 11.

In this embodiment, the employee table 20, an output sheet table 30, a sheet definition table 40, an output item table 50, an update item table 60, a time item table 70 and the like are stored in the storage 15. However, the configuration is not limited thereto. For example, the employee table 20, the output sheet table 30, the sheet definition table 40, the output item table 50, the update item table 60, the time item table 70 and the like may be stored in a storage device such as a server connected through the communicator 16, and the CPU 11 may be configured to access the storage device through the communicator 16 according to need to read or write information in the employ table 20 and the like.

Next, the information stored in the storage 15 such as data tables will be described referring to FIG. 2 and FIG. 3A to FIG. 3D. FIG. 2 illustrates the structure of the employee table 20. FIG. 3A illustrates the structure of the output sheet table 30. FIG. 3B illustrates the structure of the output item table 50. FIG. 3C illustrates the structure of the update item table 60. FIG. 3D illustrates the structure of the time item table 70.

The employee table 20 is a data table that retains current personnel information on the employees belonging to the company. As illustrated in FIG. 2, the employee table 20 includes fields of an employee code 21, an employee name 22, a name in Japanese 23, a gender 24, a birth date 25.

The employee code 21 is the identification numbers of employees. The employee name 22 is the names of the employees with the corresponding employee code 21. The name in Japanese 23 is the names of the employees in Japanese characters with the corresponding employee code 21. The gender 24 is the gender of the employees with the corresponding employee code 21. The birth dates 25 is birth dates of the employees with the corresponding employee code 21.

For example, the employee table 20 may include storage areas for photograph data linked to the employee code 21, and the photograph data of face photographs of the employees with the corresponding employee codes 21 may be stored in the storage areas in the storage 15. In this configuration, the photograph data may be included in a sheet.

The output sheet table 30 is a data table that retains information on sheets to be output on a display. As used herein, a sheet refers to data of a document related to personnel management, which includes a plurality of data in the employee table 20. As illustrated in FIG. 3A, the output sheet table 30 includes fields of a sheet code 31, a sheet name 32, an X-pixel 33, a Y-pixel 34 and a standard magnification 35.

The sheet code 31 is the identification numbers of sheets. The sheet name 32 is the names of the sheets with the corresponding sheet code 31. The X-pixel 33 is the numbers of pixels in the X (width) direction of the sheets with the corresponding sheet code 31. The Y-pixel 34 is the numbers of pixels in the Y (length) direction of the sheets with the corresponding sheet code 31. The standard magnification 35 is display magnifications for displaying a selected output item code 31 of the sheets with the corresponding sheet code 31.

The sheet definition table 40 (the structure not shown in the figure) is a data table that retains definition information required for creating sheets from the data in the employee table 20. To be more specific, the sheet definition table 40 includes, for example, fields of the employee table 20 corresponding to the data disposed in the respective sheets, the layout of the respective sheets (position and font size of the data in the fields of the sheets, display frames of the sheets, text data of the titles) and the like.

In the embodiment, it is assumed that the sheet definition table 40 is independently stored in the storage 15 for ease of description. However, the configuration is not limited thereto. For example, the data equivalent to the sheet definition table 40 may be included in the data area of a first sheet displaying program 151, a second sheet displaying program 152 and a third sheet displaying program 153.

The output item table 50 is a data table that retains information on output items indicating a predetermined set of data to be included in a sheet. As illustrated in FIG. 3B, the output item table 50 includes fields of an item code 51, an item name 52, a sheet code 53, a starting X coordinate 54, a starting Y coordinate 55, an ending X coordinate 56 and an ending Y coordinate 57.

The item code 51 is the identification numbers of output items. The item name 52 is the names of output items with the corresponding item code 51. The sheet code 53 is the sheet codes of sheets that include the output items of the corresponding item code 51. The starting X coordinate 54 is the X coordinates of the starting (upper left) points of the areas for the output items corresponding to the item code 51 in the sheets with the corresponding sheet code 53. The starting Y coordinate 55 is the Y coordinates of the starting points of the areas for the output items corresponding to the item code 51 in the sheets with the corresponding sheet code 53. The ending X coordinate 56 is the X coordinates of the ending (lower right) points of the areas for the output items corresponding to the item code 51 in the sheets with the corresponding sheet code 53. The ending Y coordinate 57 is the Y coordinates of the ending points of the areas for the output items corresponding to the item code 51 in the sheets with the corresponding sheet code 53.

The update item table 60 is a data table that retains history information on update of the contents of output items in the past. As illustrated in FIG. 3C, the update item table 60 includes fields of an update date 61, an update menu name 62, an update user 63, an employee code 64 and an item code 65.

The update date 61 is dates and times on which output items of the corresponding item code 65 of the employees of the corresponding employee code 64 were updated. The update menu name 62 is the names of update menus in which output items of the corresponding item code 65 of the employees of the corresponding employee code 64 were updated. The update user 63 is the names of the users who updated output items of the corresponding item code 65 of the employees of the corresponding employee code 64. The employee code 64 is the employee codes of the employees whose output items of the corresponding item code 65 were updated. The item code 65 is the item codes of updated output items.

The time item table 70 is a data table that retains specified times at which update of output items or the like is performed. As illustrated in FIG. 3D, the time item table 70 includes fields of a time type 71, a time code 72, a time name 73 and an item code 74.

The time type 71 is types of specified times of the corresponding time name 73. For example, the time type 71 include 1: month-date-year, 2: cutoff date and 3: day of week.

The time code 72 is specified times of the corresponding time name 73.

For example, the time code 72 is:

(i) dates (month-day-year) of specified times when the corresponding time type 71 is 1: year-month-date;

(ii) cutoff dates of specified times when the corresponding time type 71 is 2: cutoff date; and (iii) Day 1 (Monday) to Day 7 (Sunday) of specified times when the corresponding time type 71 is 3: day of week.

The time name 73 is the names of specified times. The item code 74 is the item codes of output items to be updated on specified times with the corresponding time name 73.

Figure 4:
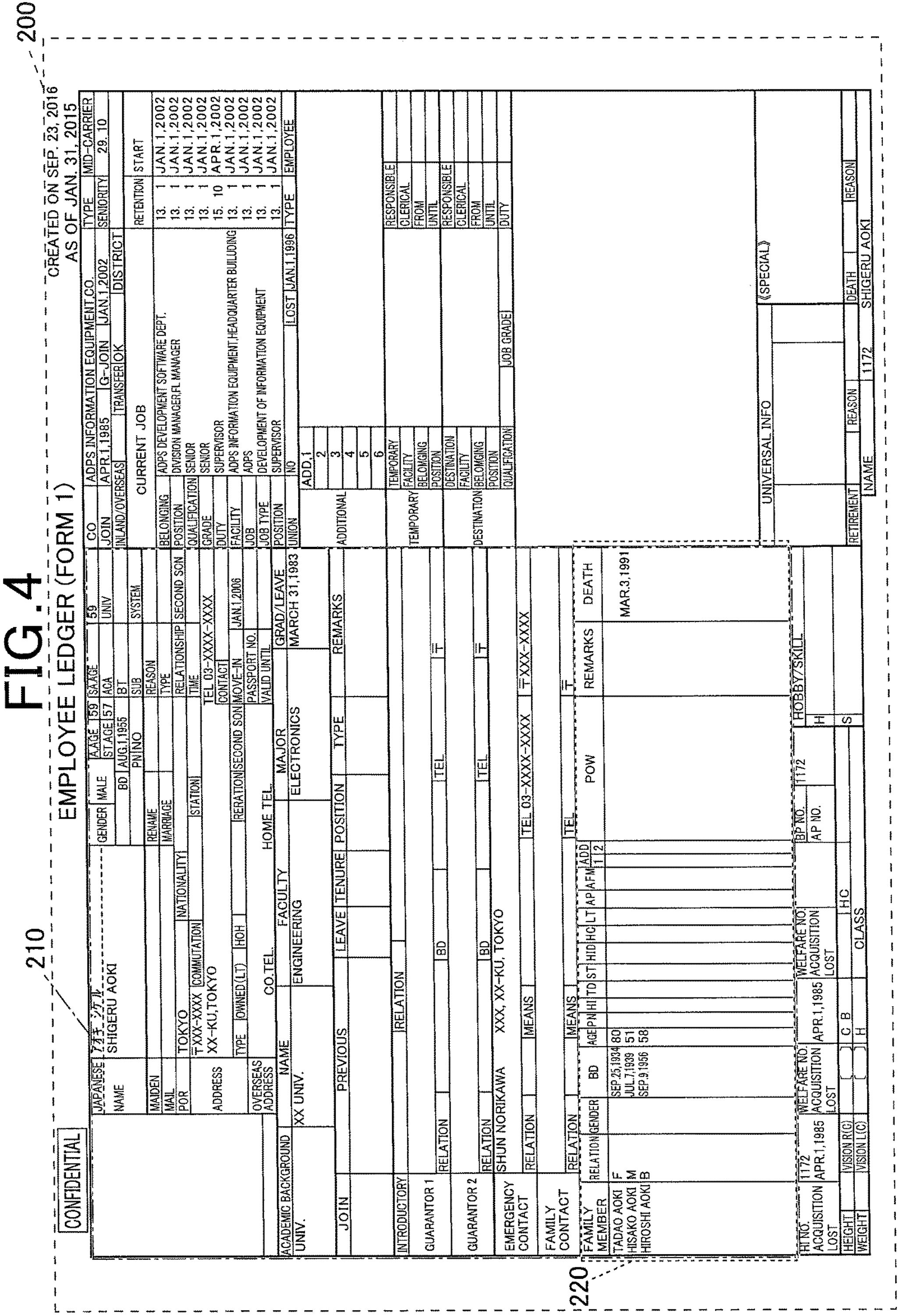
FIG. 4 illustrates an employee ledger.
Figure 5:
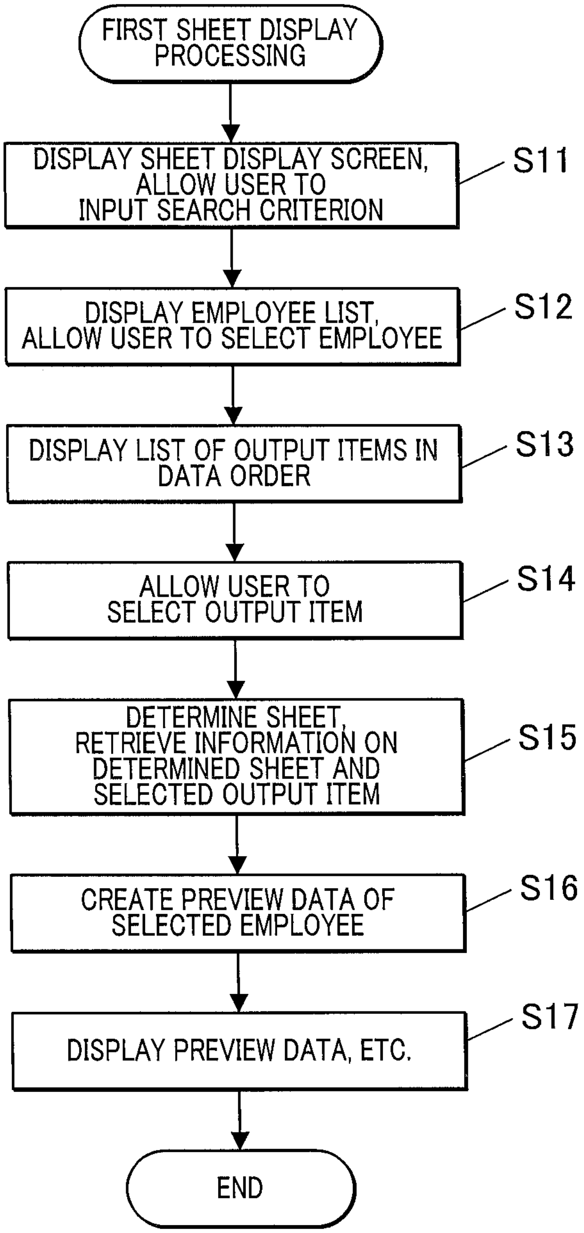
FIG. 5 illustrates the flowchart of the first sheet display processing.
Figure 6A:
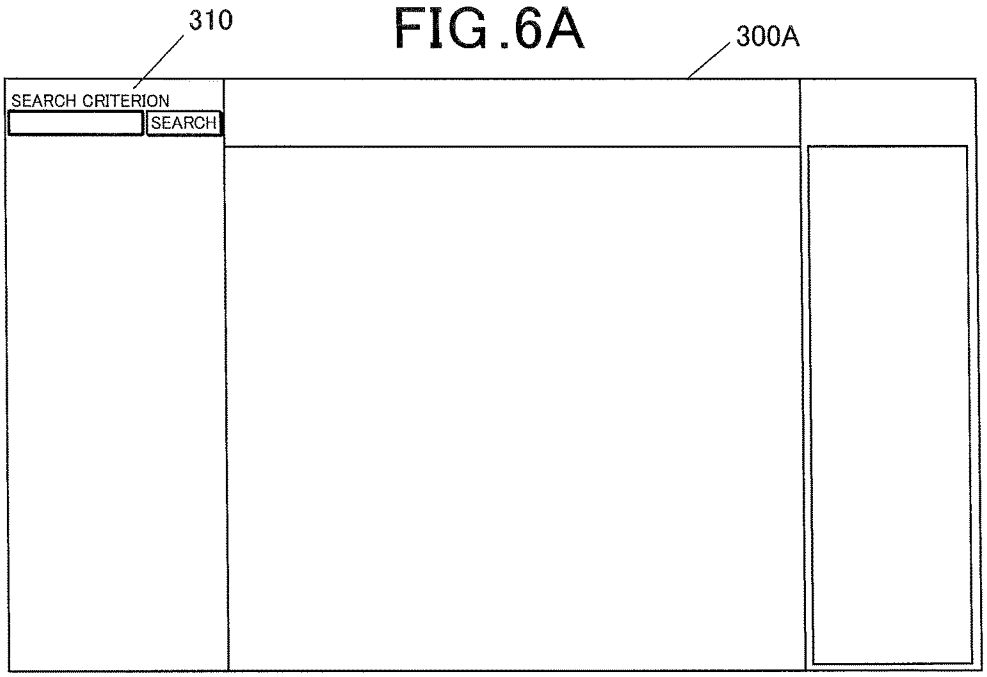
FIG. 6A illustrates the first sheet display screen.
Figure 6B:
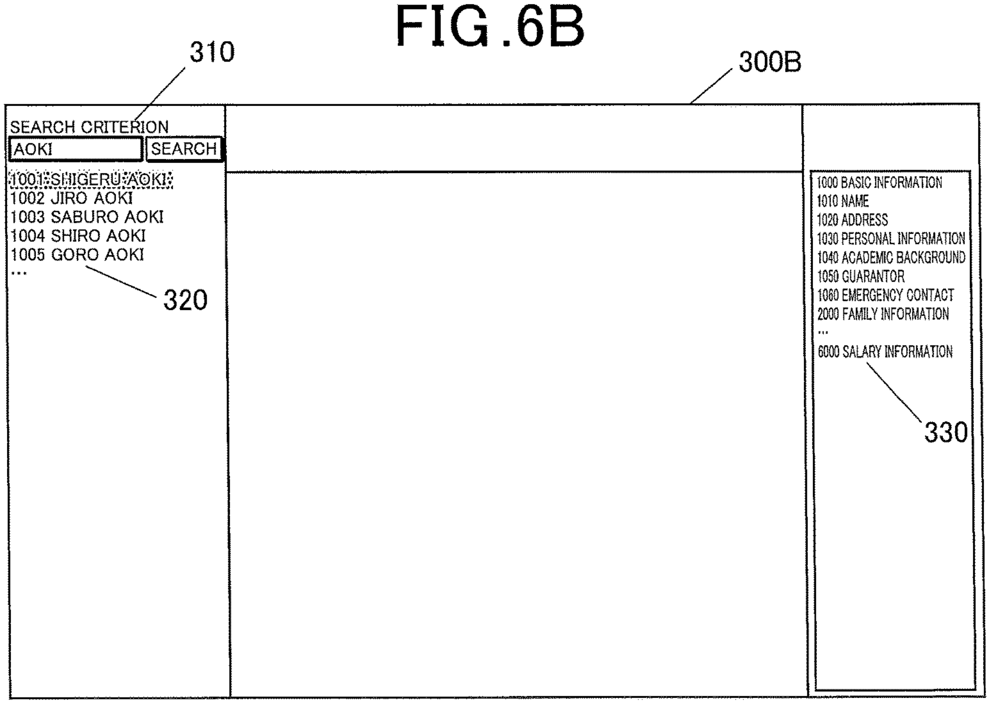
FIG. 6B illustrates the second sheet display screen.
Figure 8:
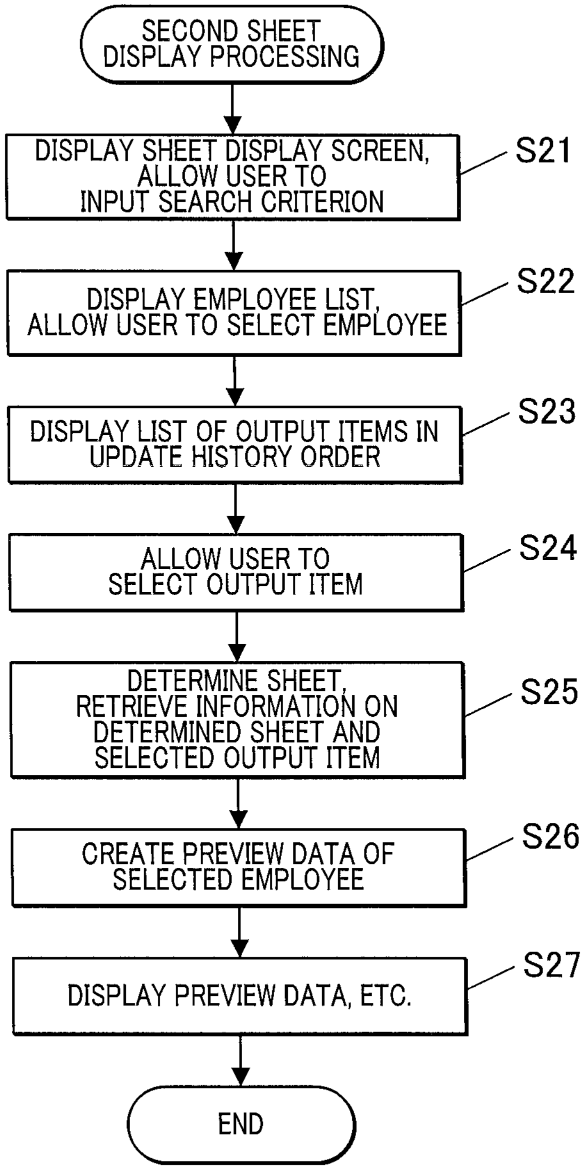
FIG. 8 illustrates the flowchart of the second sheet display processing.
Figure 10:
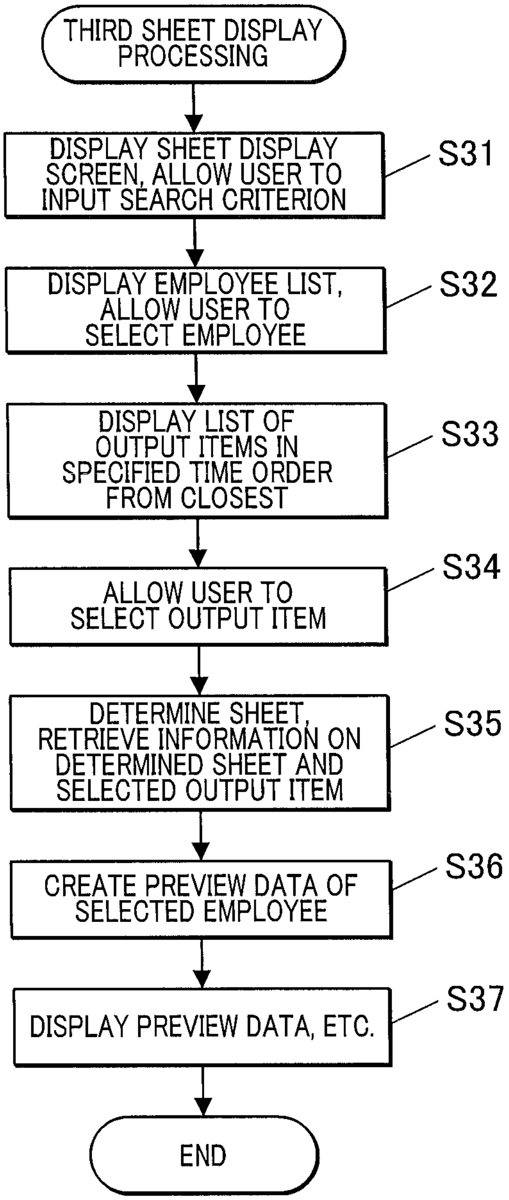
FIG. 10 illustrates the flowchart of the third sheet display processing.

Next, the operation of the personnel information managing apparatus 10 will be described referring to FIG. 4 to FIG. 11. FIG. 4 illustrates an employee ledger 200. FIG. 5 illustrates a flowchart of first sheet display processing. FIG. 6A illustrates a sheet display screen 300A. FIG. 6B illustrates a sheet display screen 300B. FIG. 7 illustrates a sheet display screen 300C. FIG. 8 illustrates the flowchart of second sheet display processing. FIG. 9 illustrates a sheet display screen 400. FIG. 10 illustrates the flowchart of third sheet display processing. FIG. 11 illustrates a sheet display screen 500.

First, the employee ledger 200 will be described with FIG. 4 as an example of sheets. As illustrated in FIG. 4, the employee ledger 200 corresponds to the sheet name 32 "employee ledger (Form 1)", in which a variety of personnel information of the employees is recorded with respect to each employee. As illustrated in FIG. 4, for example, various information on the employee name 22 "Shigeru Aoki" in the employee table 20 is disposed in display frames in the employee ledger 200. Since the employee ledger 200 includes many output items, it takes a lot of trouble for the user (e.g. an operator such as a person in charge of personnel) to visually find out a desired output item in the whole image of the employee ledger 200. Particularly, it takes more trouble for an inexperienced user.

For example, the employee ledger 200 includes basic information 210 as output items with the item name 52 "basic information" and family information 220 as output items with the item name 52 "family information". The basic information 210 includes the name (employee name), the name in Japanese, the gender, the birth date, the family information 220 of an employee. The family information 220 includes the name(s) and the relationship(s) of the family member(s) of an employee.

Next, the first sheet display processing will be described referring to FIGS. 5 and 7. The first sheet display processing is to display output items in the data order in a selectable manner and to display a sheet of an employee in a manner that mainly shows a selected output item. In the personnel information managing apparatus 10, in response to a trigger user input of a command to perform the first sheet display processing through the operation interface 12 for example, the CPU 11 performs the first sheet display processing in cooperation with the first sheet displaying program 151 that has been read out from the storage 15 and suitably developed in the RAM 13.

As illustrated in FIG. 5, the CPU 11 creates sheet display screen information to display it on the display 14 and allows the user to input a search criterion on the employees through the operation interface 12 (Step S11). In Step S11, for example, a sheet display screen 300A as illustrated in FIG. 6A is displayed. The sheet display screen 300A includes a search criterion input area 310.

The search criterion input area 310 includes a search criterion input box for inputting a search criterion such as a part of an employee name or an employee code and a search button for conducting a search.

Then, the CPU 11 searches the employee table 20 stored in the storage 15 in the search criterion input in Step S11 and displays the employee code 21 and the employee name 22 of the employees of retrieved records on the display 14. The CPU 11 then allows the user to select an employee (employee code, employee name) to be displayed from among the displayed employee list through the operation interface 12 (Step S12). In Step S12, for example, a sheet display screen 300B as illustrated in FIG. 6B is displayed.

The sheet display screen 300B further includes an employee list area 320 in addition to the components of the sheet display screen 300A. The employee code 21 and the employee name 22 of the employees retrieved in Step S12 are displayed in a list in the employee list area 320, in which the user is allowed to select an employee. At this moment, an item list area 330 to be described below is not displayed yet.

Then, the CPU 11 displays the item code 51 and the item name 52 of all records in the output item table 50 stored in the storage 15 on the display 14 in a list format in the data order (in the ascending order of the records) (Step S13). In Step S13, for example, the sheet display screen 300B as illustrated in FIG. 6B is displayed including the item list area 330. The item code 51 and the item name 52 of the output items of all records are displayed in the item list area 330 in a list in the data order, in which the user is allowed to select an output item.

Then, CPU 11 allows the user to select an output item (item code, item name) to be displayed from the output item list displayed in Step S13 through the operation interface 12 (Step S14). In Step 14, for example, the output item of the item code "1000" and the item name "basic information" is selected.

Then, the CPU 11 determines a sheet that corresponds to the output item selected in Step S14 based on the output sheet table 30 and the output item table 50 and retrieves information on the selected output item and the determined sheet (Step S15). In Step S15, for example, the record in the output item table 50 that has the item name 52 "basic information" are retrieved, and since the item name 52 "basic information" corresponds to the sheet code 53 "1" in the output sheet table 30, the record in the output sheet table 30 that has the sheet code 31 "1" and the sheet name 32 "employee ledger (Form 1)" are also retrieved.

Then, by using the sheet definition table 40 stored in the storage 15, the CPU 11 retrieves data in the employee table 20 that corresponds to the sheet determined in Step S15 and the employee selected in Step S12. By using the retrieved data and the definition information on the sheet in the sheet definition table 40, the CPU 11 creates preview data of the sheet of the selected employee (Step S16). In Step S16, for example, image data of the employee ledger 200 of the sheet "employee ledger (Form 1)" of the selected employee "Sigeru Aoki" is created as the preview data.

Then, by using the sheet name 32, the X-pixel 33, the Y-pixel 34, the standard magnification 35, the starting X coordinate 54 and the starting Y coordinate 55 of the information retrieved in Step S15, the CPU 11 displays the preview data created in Step S16 at the standard magnification 35 on the display 14 such that the starting point (pixel X 33, pixel Y 34) of the selected output item is located at the upper left of the sheet display area (Step S17). Then, the first sheet display processing ends. In Step S17, for example, the sheet display screen 300C as illustrated in FIG. 7 is displayed.

The sheet display screen 300C further includes a title display area 340 and a sheet display area 350 in addition to the components of the sheet display screen 300B. In the title display area 340, the sheet name 32 of the sheet determined in Step S15 is displayed. In the title display area 340, for example, the sheet name 32 "employee ledger (Form 1)" is displayed. In the sheet display area 350, the preview data of the sheet created in Step S16 is displayed at the standard magnification 35. In the initial state, the starting point of the part corresponding to the selected output item is located at the upper left. In the sheet display area 350, for example, the basic information 210 in the employee ledger 200 of the sheet "employee ledger (Form 1)" of the employee "Shigeru Aoki" selected in Step S12 is displayed.

According to a user operation of sliding the pointer on the operation interface 12, the preview data can be arbitrarily scrolled so that the area displayed in the sheet display area 350 is changed.

Next, a second sheet display processing will be described referring to FIG. 8 and FIG. 9. The second sheet display processing is to display output items in the order of the update history in a selectable manner and to display a sheet of an employee in a manner that mainly shows a selected output item. In the personnel information managing apparatus 10, in response to a trigger user input of a command to perform the second sheet display processing through the operation interface for example, the CPU 11 performs the second sheet display processing in cooperation with the second sheet displaying program 152 that has been read out from the storage 15 and suitably developed in the RAM 13.

As illustrated in FIG. 8, Step S21 and Step S22 are the same as Step S11 and Step S12 of the first sheet display processing. Subsequently, the CPU 11 displays the output items (item code 51, item name 52) of the records in the output item table 50 in a list, which are sorted in the order of the update history from the one with the latest update date 61 (from the one closest to the current date and time) of all records with the employee code 64 of the employee selected in Step S22 in the update item table 60 stored in the storage 15 by using the correspondence to the item code 65 (Step S23). When two or more records in the update item table 60 have the same item code 65, for example, the record with the later update date 61 is used for the list display of the output items. Further, when a record in the output item table 50 does not correspond to the item code 65, the output item of the record is not displayed. Alternatively, when a record in the output item table 50 does not correspond to the item code 65, the output item (item code 51, item name 52) of the record may be displayed after the output items of records that corresponds to the item code 65. Two or more of such records may be listed in the data order of the output item table 50. Further, records in the output item table 50 that correspond to the item code 65 (i.e. that have update history) and records in the output item table 50 that do not correspond to the item code 65 (i.e. that do not have update history) may be displayed in mutually distinguishable manner in a list or a sheet (e.g. output items with update history are highlighted (by changing the background color, the text color, the font or the like)).

In Step S23, for example, a sheet display screen 400 as illustrated in FIG. 9 is displayed. The sheet display screen 400 includes a search criterion input area 410, an employee list area 420 and an item list area 430.

The search criterion input area 410 and the employee list area 420 are the same as the search criterion input area 310 and the employee list area 320 in FIG. 7. In the item list area 430, the item code 51 and the item name 52 of the records in the output item table 50 that have update history (that correspond to item code 65) of the selected employee (employee code 64) are listed in the order of update history from the one with the latest update date 61, in which the user is allowed to select an output item. At this moment, the title display area 440 and the sheet display area 450 are not displayed yet.

The following Step S24, Step S25, Step S26 and Step S27 are the same as Step S14, Step S15, Step S16 and Step S17 of the first sheet display processing. In Step S27, for example, the sheet display screen 400 is displayed including the title display area 440 and the sheet display area 450. The title display area 440 and the sheet display area 450 are the same as the title display area 340 and the sheet display area 350 in FIG. 7. In the sheet display screen 400, in response to a user input of selecting the output item "basic information" in the item list area 430, the employee ledger 200 is displayed in a scrollable manner such that the starting point of the basic information 210 corresponding to the selected output item is located at the upper left of the sheet display area 450.

Next, third sheet display processing will be described referring to FIG. 10 and FIG. 11. The third sheet display processing is to display output items in the order from the one with the closest specified time in a selectable manner and to display a sheet of an employee in a manner that mainly shows a selected output item. In the personnel information managing apparatus 10, in response to a trigger user input of a command to perform the third sheet display processing through the operation interface for example, the CPU 11 performs the third sheet display processing in cooperation with the third sheet displaying program 153 that has been read out from the storage 15 and suitably developed in the RAM 13.

As illustrated in FIG. 10, Step S31 and Step S32 are the same as Step S11 and Step S12 of the first sheet display processing. Subsequently, the CPU 11 retrieves the current date and time information from the time counter 17 and displays the output items (item code 51, item name 52) of the records in the output item table 50 in a list, which are sorted in the order from the one with the closest specified time of the time code 72 to the current date and time of all records in the time item table 70 stored in the storage 15 by using the correspondence to the item code 74 (Step S33). When two or more records in the time item table 70 have the same item code 74, for example, the record with the closer time code 72 to the current date and time information is used for the list display of the output items. Further, when a record in the output item table 50 does not correspond to the item code 74, the output item of the record is not displayed. Alternatively, when a record in the output item table 50 does not correspond to the item code 74, the output item (item code 51, item name 52) of the record may be displayed after the output items records that corresponds to the item code 74. Two or more of such records may be listed in the data order of the output item table 50. Further, records in the output item table 50 that correspond to the item code 74 (i.e. corresponding to the specified time) and records in the output item table 50 that do not correspond to the item code 74 (i.e. not corresponding to the specified time) may be displayed in a list or a sheet in mutually distinguishable manner (e.g. the output items corresponding to the specified time are highlighted (by changing the background color, the text color, the font or the like)).

In Step S33, for example, a sheet display screen 500 as illustrated in FIG. 11 is displayed. The sheet display screen 500 includes a search criterion input area 510, an employee list area 520 and an item list area 530.

The search criterion input area 510 and the employee list area 520 are the same as the search criteria input area 310 and the employee list area 320 in FIG. 7. In the item list area 530, the item code 51 and the item name 52 of the output item records in the output item table 50 that have a specified time (that correspond to the item code 74) are listed in the order from the one with the closest time code 72 to the current date and time, in which the user is allowed to select an output item. In the item list area 530, the time name 73 of the specified times (YE Adj. Doc.=preparation of document for year-end adjustment, cutoff 20=cutoff at 20th, Mon.=Monday) are added to the output items. At this moment, the title display area 540 and the sheet display area 550 are not displayed.

The following Step S34, Step S35, Step S36 and Step S37 are the same as Step S14, Step S15, Step S16 and Step S17 of the first sheet display processing. In Step S37, the sheet display screen 500 is displayed including the title display area 540 and the sheet display area 550. The title display area 540 and the sheet display area 550 are the same as the title display area 340 and the sheet display area 350 in FIG. 7. In the sheet display screen 500, in response to a user input of selecting the output item “family information (YE Adj. Doc.)” in the item list area 530, the employee ledger 200 is displayed in a scrollable manner such that the starting point of the family information 220 of the selected output item is located at the upper left of the sheet display area 550.

In the above-described embodiment, the personnel information managing apparatus 10 displays a list of output items included in the sheets on the display 14, allows the user to select a desired output item from the list of output items through the operation interface 12, determines the sheet that includes the selected output item, and displays a sheet image of the part corresponding to the selected output item of the determined sheet on the display 14.

Therefore, the user can readily select a desired output item included in a sheet to display it and can thereby readily and surely view (access to) the desired output item in a corresponding sheet by visual observation with pinpoint accuracy.

The personnel information managing apparatus 10 displays a sheet image of the part corresponding to the selected output item of the sheet at a display magnification according to the standard magnification 35 that is preset with respect to each output item. Therefore, output items in a sheet can be displayed at a suitable and easily visible display magnification. For example, even in a sheet that includes information in a small text or the like, the sheet image of the output item can be enlarged and displayed in an easily visible manner.

The personnel information managing apparatus 10 displays the sheet image of the part corresponding to the selected output item of the sheet at a predetermined location (at which the starting point of the output item is coincide with the upper left of the sheet display area) in a display area of the display 14. Therefore, the output item in the sheet can be displayed at a suitable and easily visible location. The display location is not limited to the above-described location at which the starting point of the output item is coincide with the upper left of the sheet display area. For example, the display location may be any other suitable location such as a location at which the starting point of the output item is coincide with the center of the sheet display area.

The personnel information managing apparatus 10 sorts the output items in the data order to display a list of the items in the first sheet display processing. Therefore, by setting the data order so that a frequently viewed output item is listed first, selection of an output item that is highly probably referenced can be made readily.

The personnel information managing apparatus 10 sorts output items in the update order from the latest update according to the update item table 60 to display the list of the output items in the second sheet display processing. Therefore, selection of an output item that has been lately updated and therefore highly probably required can be made more readily.

The personnel information managing apparatus 10 sorts output items in the specified order from the specified time closest to the current date and time according to the time item table 70 to display a list of the output items in the third sheet display processing. Therefore, selection of an output item that has a specified time close to the current date and time and is therefore highly probably required since the specified date is close to the current date, can be made more readily.

The sheets are created with respect to each of the employees that are the management objects. The personnel information managing apparatus 10 displays a list of employees on the display 14, allows the user to select a desired employee from the list of employees through the operation interface 12 and displays the sheet image of the part corresponding to the selected output item of the determined sheet for the selected employee. Therefore, the sheet image of the part corresponding to the selected output item of the sheet of the desired employee can be readily selected and displayed.

The personnel information managing apparatus 10 displays the sheet image of the part corresponding to the selected output item of the determined sheet in a scrollable manner. Therefore, the user can view the desired output item readily and surely and also view the other part of the sheet readily by scrolling it.

The above description discloses an example in which an HDD, an SSD or the like of the storage 15 is used as the computer-readable medium storing the program according to the present invention. However, the present invention is not limited to the illustrated example. Flash memories and portable recording media such as CD-ROMs are also applicable as the computer-readable medium. Carrier wave is also applicable as a medium for providing data of the program according to the present invention through a communication line.

While an embodiment of the present invention is described, the embodiments of the present invention is not limited thereto and a variety of changes can be made.

For example, in the above-described embodiment, the part corresponding to the selected output item of the whole image of the sheet is displayed in a scrollable manner in the sheet display screen such that the starting point of the part is coincide with the upper left of the sheet display area. However, the present invention is not limited thereto.

Figure 12:
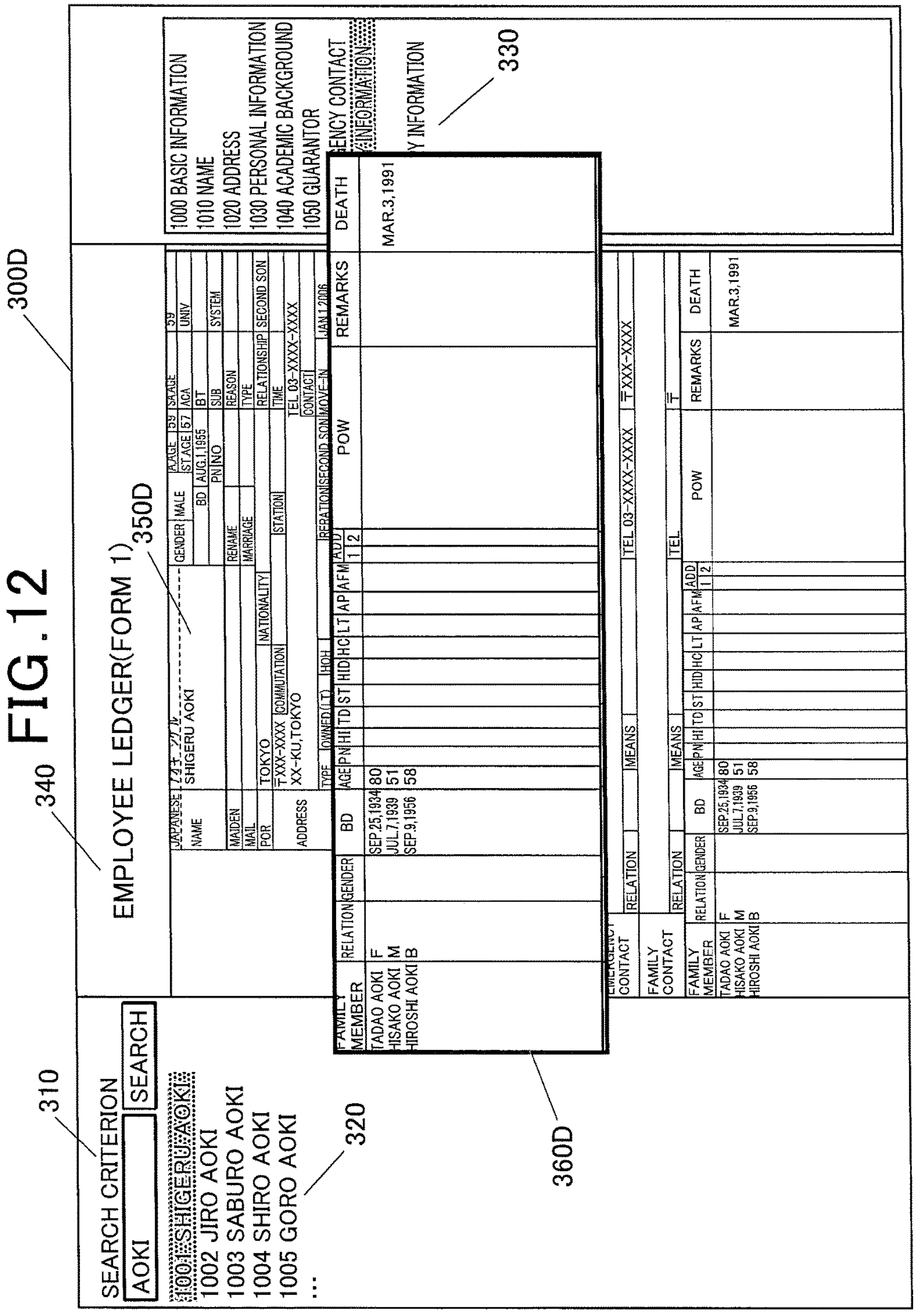
FIG. 12 illustrates the sixth sheet display screen.

For example, a sheet display screen 300D as illustrated in FIG. 12 may be displayed as the sheet display screen. FIG. 12 illustrates the sheet display screen 300D. The sheet display screen 300D includes the search criterion input area 310, the employee list area 320, the item list area 330, the title display area 340, a sheet display area 350D and an item display area 360D. The sheet display screen 300D is different from the sheet display screen 300C of FIG. 7 in the sheet display area 350D and the item display area 360D.

In the sheet display area 350D, the preview data of the determined sheet, which has been determined based on the employee selected in the employee list area 320 and the output item selected in the item list area 330, is displayed in the original size in a scrollable manner such that the starting point thereof is located at the upper left. In the item display area 360D, the preview data of the determined sheet, which has been determined based on the employee selected in the employee list area 320 and the output item selected in the item list area 330, is displayed at the standard magnification 35 as a pop-up window over the sheet display area 350D or the like.

For example, in the first sheet display processing, when the user selects the employee "Shigeru Aoki" and the output item "family information" so that it is determined to display the sheet "employee ledger (Form 1)", the family information 220 is displayed in the item display area 360D at a standard magnification 35 of the "employee ledger (Form 1)" of 1.2. To extract the family information 220 from the preview data of the employee ledger 200, the starting X coordinate 54, the starting Y coordinate 55, the ending X coordinate 56 and the ending Y coordinate 57 in the output item table 50 that correspond to the item code 51 "family information" are used. Also in the second and third sheet display processing, a sheet is determined based on the selected employee and the selected output item, and the part corresponding to the selected output item of the preview data of the determined sheet may be similarly displayed at the standard magnification 35 as a pop-up window in the sheet display screen.

As described above, the personnel information managing apparatus 10 displays the sheet image of the part corresponding to the selected output item of the determined sheet as a pop-up window. Therefore, the user can view a desired output item readily and surely in a separate window.

Alternatively, a sheet display screen 300E as illustrated in FIG. 13 may be displayed as the sheet display screen. FIG. 13 illustrates the sheet display screen 300E. The sheet display screen 300E includes the search criterion input area 310, the employee list area 320, the item list area 330, the title display area 340, a sheet display area 350E and an item display area 360E. The sheet display screen 300E is different from the sheet display screen 300C of FIG. 7 in the sheet display area 350E and the item display area 360E.

In the sheet display area 350E, the preview data of the determined sheet, which has been determined based on the selected employee and the selected output item, is displayed in the original size in a scrollable manner such that the starting point thereof is located at the upper left. The item display area 360E is provided separately from the sheet display area 350E, in which the part corresponding to the selected output item of the preview data of the determined sheet, which has been determined based on the selected employee and the selected output item, is displayed at the standard magnification 35.

For example, in the first sheet display processing, when the user selects the employee "Shigeru Aoki" and the output item "family information" so that it is determined to display the sheet "employee ledger (Form 1)", the family information 220 is displayed in the item display area 360E at a standard magnification 35 of the "employee ledger (Form 1)" of 1.2. To extract the family information 220 from the preview data of the employee ledger 200, the starting X coordinate 54, the starting Y coordinate 55, the ending X coordinate 56 and the ending Y coordinate 57 in the output item table 50 that correspond to the item code 51 "family information" are used. Also in the second and third sheet display processing, a sheet is determined based on the selected employee and the selected output item, and the part corresponding to the selected output item of preview data of the determined sheet may be similarly displayed at the standard magnification 35 in the item display area.

As described above, the personnel information managing apparatus 10 displays the sheet image of the part corresponding to the selected output item of the determined sheet in another display area different from the whole sheet display area. Therefore, the user can view a desired output item readily and surely. Furthermore, the user can view the desired output item along with the whole sheet display area.

In the above-described embodiment, the preview data of a sheet is newly created in the first to third sheet display processing. However, the present invention is not limited thereto. For example, the preview data of the sheets of the respective employees may be created and stored in the storage 15 beforehand, and the CPU 11 may read out and retrieve the preview data of a sheet corresponding to the selected employee and the selected output item from the storage 15 in the first to third sheet display processing.

Access permission information indicating the absence or presence of access permission may be set with respect to each user and each output item. In this configuration, the CPU 11 displays the part corresponding to the selected output item of the sheet in the first to third sheet display processing when the user has access permission to the selected output item based on the access permission information. The access permission information may be embedded in the data (preview data) of the sheets.

In the above-described embodiment, the management object is employees, and an output item in a sheet of an employee is displayed. However, the present invention is not limited thereto. For example, the management object may also be persons and objects other than employees. For example, an output item in a sheet of a non-employee may be displayed, or an output item in a sheet of the specification or the like of an object such as a commercial product may be displayed.

It should be understood well that suitable changes can be made in the detailed configuration and the detailed operation of the components of the personnel information managing apparatus 10 according to the above-described embodiment without departing from the features of the present invention.

The section that performs the processing for displaying the sheets, which is composed of the CPU 11, the RAM 13, the storage 15 and the like, can also be achieved by a normal computer system instead of the dedicated system. For example, a computer program for performing the processing may be distributed as a computer-readable medium (e.g. a flexible disk, a CD-ROM, a DVD-ROM or the like) in which the program is stored. The section that performs the processing for displaying the sheets may be achieved by installing the computer program to a computer. Alternatively, the computer program may be stored in a storage of a server in a communication network such as the Internet. The section that performs the processing for displaying the sheets may be achieved by downloading the computer program to a normal computer system.

When the function of the section that performs the processing for displaying the sheets is achieved by an application program with the aid of or in cooperation with an OS (Operating System), only the application program may be stored in a computer-readable medium or a storage.

Alternatively, the computer program may be distributed through a communication network. For example, the computer program may be distributed through the communication network by posting the computer program on a message board on the communication network. The above-described processing can be performed by launching the computer program and running it under the control of an OS as with the other application programs.

While an embodiment of the present invention is described, the scope of the present invention is not limited to the above-described embodiment but encompasses the scope of the invention recited in the claims and the equivalent thereof.

The present invention can be embodied in a variety of configurations, and a variety of changes such as omits and replacements can be further made to such configurations without departing from the features of the present invention. Such embodiments and the variations thereof are included in the scope and the features of the present invention disclosed herein and in the invention recited in the claims and the equivalents thereof.

What is claimed is:

1. An apparatus, comprising:

a processor configured to:

control a display to display a list of items included in sheets;

select an item from the list of the items based on input operation by a user;

determine a sheet which includes the selected item;

determine coordinates of a part of the determined sheet, the part corresponding to the selected item; and control the display to display a sheet image of the part, corresponding to the selected item, of the determined sheet based on the determined coordinates.

2. The apparatus according to claim 1, wherein the processor is configured to change a display magnification of the sheet image of the part, corresponding to the selected item, of the determined sheet according to display magnification information which is preset with respect to each of the items.

3. The apparatus according to claim 1, wherein the processor is configured to control the display to display the sheet image of the part, corresponding to the selected item, of the determined sheet at a predetermined location in a display area of the display.

4. The apparatus according to claim 1, wherein the processor is configured to:

sort the items in a data order; and control the display to display the list of the items sorted in the data order.

5. The apparatus according to claim 1, wherein the processor is configured to:

sort the items in an update order from a latest update based on update history information on the items; and control the display to display the list of items sorted in the update order.

6. The apparatus according to claim 1, wherein the processor is configured to:

sort the items in a specified time order from a specified time closest to a current date and time based on specified time information on tasks related to the respective items; and control the display to display the list of items sorted in the specified time order.

7. The apparatus according to claim 1, wherein the sheets are created for respective management objects, and wherein the processor is configured to:

control the display to display a list of the management objects;

select a management object from the list of the management objects based on input operation by the user; and control the display to display the sheet image of the part, corresponding to the selected item, of the determined sheet of the selected management object.

8. The apparatus according to claim 1, wherein the processor is configured to control the display to display the sheet image of the part, corresponding to the selected item, of the determined sheet in a scrollable manner.

9. The apparatus according to claim 1, wherein the processor is configured to control the display to display the sheet image of the part, corresponding to the selected item, of the determined sheet in a pop-up window.

10. The apparatus according to claim 1, wherein the processor is configured to control the display to display the sheet image of the part, corresponding to the selected item, of the determined sheet in a display area different from a display area of the whole sheet.

11. An information processing method comprising:

controlling, by a processor, a display to display a list of items included in sheets;

selecting, by the processor, an item from the list of the items based on input operation by a user;

determining, by the processor, a sheet which includes the selected item;

determine, by the processor, coordinates of a part of the determined sheet, the part corresponding to the selected item; and controlling, by the processor, the display to display a sheet image of the part, corresponding to the selected item, of the determined sheet based on the determined coordinates.

12. The method according to claim 11, further comprising:

changing a display magnification of the sheet image of the part, corresponding to the selected item, of the determined sheet according to display magnification information which is preset with respect to each of the items.

13. The method according to claim 11, wherein the sheets are created for respective management objects, and wherein the method comprises:

controlling the display to display a list of the management objects;

selecting a management object from the list of the management objects based on input operation by the user; and controlling the display to display the sheet image of the part, corresponding to the selected item, of the determined sheet of the selected management object.

14. The method according to claim 11, comprising:

controlling the display to display the sheet image of the part, corresponding to the selected item, of the determined sheet in a scrollable manner.

15. The method according to claim 11, comprising:

controlling the display to display the sheet image of the part, corresponding to the selected item, of the determined sheet in a display area different from a display area of the whole sheet.

16. A non-transitory computer-readable medium storing a program causing a computer to perform:

controlling a display to display a list of items included in sheets;

selecting an item from the list of the items based on input operation by a user;

determining a sheet which includes the selected item;

determining coordinates of a part of the determined sheet, the part corresponding to the selected item; and controlling the display to display a sheet image of the part, corresponding to the selected item, of the determined sheet based on the determined coordinates.

17. The non-transitory computer-readable medium according to claim 16, wherein the program further causes the computer to change a display magnification of the sheet image of the part, corresponding to the selected item, of the determined sheet according to display magnification information which is preset with respect to each of the items.

18. The non-transitory computer-readable medium according to claim 16, wherein the sheets are created for respective management objects, and wherein the program causes the computer to:

control the display to display a list of the management objects; and select a management object from the list of the management objects based on input operation by the user; and control the display to display the sheet image of the part, corresponding to the selected item, of the determined sheet of the selected management object.

19. The non-transitory computer-readable medium according to claim 16, wherein the program causes the computer to control the display to display the sheet image of the part, corresponding to the selected item, of the determined sheet in a scrollable manner.

20. The non-transitory computer-readable medium according to claim 16, wherein the program causes the computer to control the display to display the sheet image of the part, corresponding to the selected item, of the determined sheet in a display area different from a display area of the whole sheet.

* * * * *